Dec. 29, 1970     H. A. RAYMOND     3,550,457

FLUID ACCELEROMETER

Filed June 11, 1968

Hugh A. Raymond,
INVENTOR.

BY Harry M. Saragovitz
Edward J. Kelly
Herbert Berl
Aubrey J. Dunn

United States Patent Office 3,550,457
Patented Dec. 29, 1970

3,550,457
FLUID ACCELEROMETER
Hugh A. Raymond, Dresher, Pa., assignor to the United States of America as represented by the Secretary of the Army
Filed June 11, 1968, Ser. No. 738,717
Int. Cl. G01p 7/00
U.S. Cl. 73—503                                     6 Claims

ABSTRACT OF THE DISCLOSURE

A magnetically permeable float is contained within a cylinder also containing a viscous fluid. The cylinder is spun about its longitudinal axis to center the float; and is surrounded by sensing and balancing coils. An alternating current is applied to a primary coil, and the axial position of the float is sensed by the coupling of the A-C to secondary coils. A direct current is also superimposed on the normal A-C in the coils, and causes the float to assume a central longitudinal position in the cylinder, in the absence of acceleration.

BACKGROUND OF THE INVENTION

Various types of accelerometers with floats suspended in rotating fluid containers are known. The floats provide outputs by varying the coupling between capacitor plates, or by varying the amount of light falling on photocells, or by varying the resistance between output contacts. Examples of accelerometers with variable capacitors are those shown in U.S. Pats. 2,840,366; 2,978,638 and 3,132,530 to W. G. Wing. An example of an accelerometer using photocells is that shown in U.S. Pat. No. 3,142,990 to V. H. Aske. An accelerometer using variable resistance may employ a conductive fluid suspending the float, and have the float made of an insulator. As the float moves axially in ahe fluid container, it causes variations in the resistance seen by contacts connected to various points on the fluid container.

Each of the above described known accelerometers suffers from one or more deficiencies. In the case of the capacitive accelerometers, slip rings and brushes are necessary to get outputs, and the float can only be rebalanced or repositioned to its quiescent position through fluid pressure. In the case of U.S. Pat. No. 3,132,520 to Wing and U.S. Pat. No. 3,142,990 to Aske, rebalance of the float is accomplished by varying the speed of the motors driving the float containers. The variable resistance accelerometer requires a conductive fluid. The instant invention overcomes these deficiencies, and provides additional unexpected desirable features.

SUMMARY OF THE INVENTION

An accelerometer using a magnetically permeable float in a fluid-filled rotating cylinder. Coils surrrounding the cylinder are energized with A-C to detect the displacement of the float from a quiescent position, and with D-C to bias the float to its quiescent position. No slip rings and/or brushes or other types of electrical connections are made to the cylinder, and the float may be rapidly rebalanced in the presence of acceleration.

An object of the invention is to provide an improved fluid integrating accelerometer.

Another object of the invention is to provide a fluid integrating accelerometer which has no electrical connections to the float container.

These, and other objects which may be obvious to one skilled in the art, may be obtained by the invention as shown in the accompanying drawings.

DESCRIPTION OF THE PREFERRED EMBODIMENT

Figure 1:
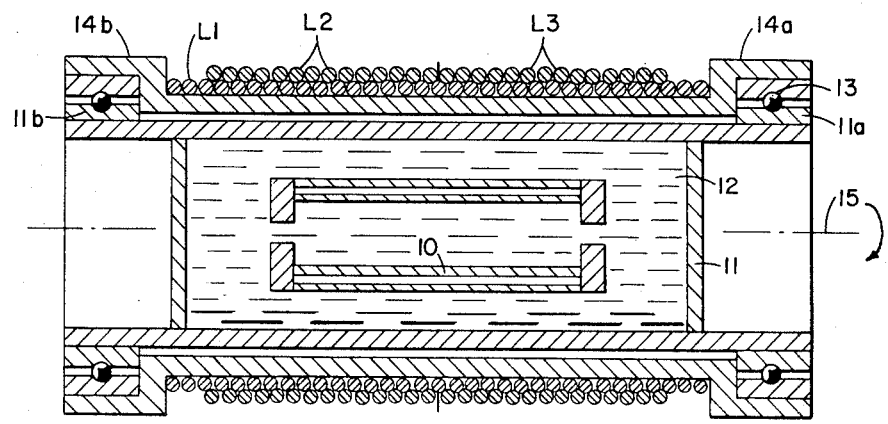
FIG. 1 of the drawings shows a longitudinal sectional view of the invention.

Referring to FIG. 1, numeral 10 designates the magnetically permeable float. This float is in tube 11, filled with fluid 12. Tube 11 has end portions 11a and 11b which act as inner races for ball bearings 13. Tube 11 is surrounded by housing 14, which housing has portions 14a and 14b acting as outer races for ball bearings 13. Tube 11 is rotated about axis 15 by a motor (not shown). Surrounding housing 14 are coils L1, L2, and L3.

Figure 2:
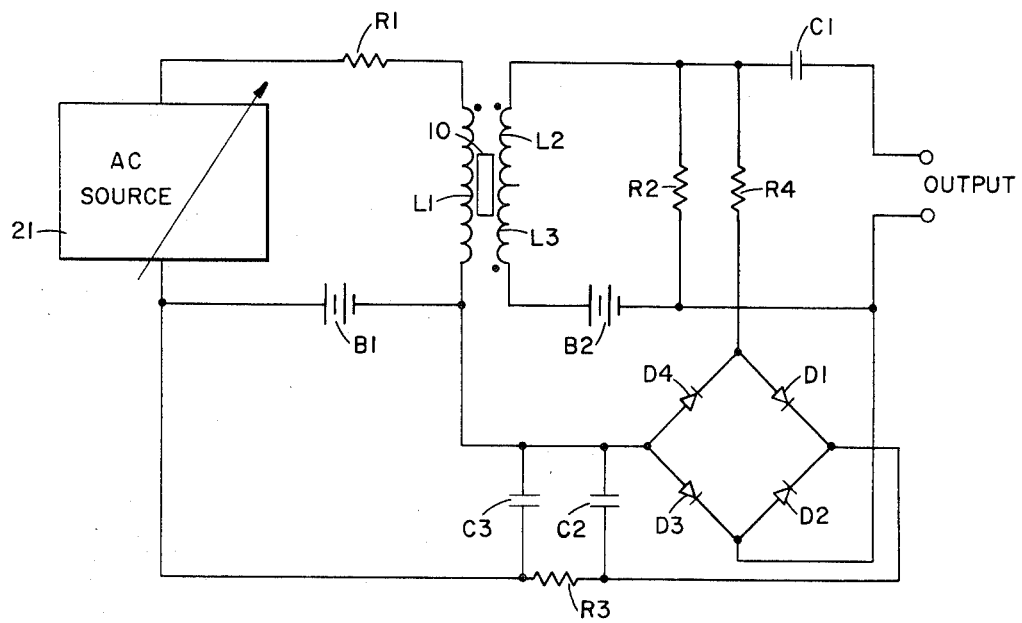
FIG. 2 shows an electrical schematic diagram including the invention.

The operation of the invention in its circuit may be understood by reference to FIG. 2, wherein the same reference numerals are used for elements from FIG. 1. FIG. 2 includes an A-C source 21 with one side connected through resistor R1 to one end of coil L1. The other side of 21 is connected through battery B1 to the other end of coil L1. Coils L2 and L3 are so wound that their outputs are in series opposition. Battery B2 and resistor R2 are connected in series with coils L2 and L3. Batteries B1 and B2 provide D-C through their respective coils in order for steady-state magnetic fields to be established in the coils. Coils L2 and L3, as connected, provide an axial magnetic gradient. L1 induces a field in float 10. The gradient of coils L2 and L3 makes float 10 tend to center itself axially in the coils. Resistors R1 and R2 limit battery current in their respective circuits, and may be made variable, if desired. An output is coupled to coils L2 and L3 by D-C blocking capacitor C1.

Since coils L2 and L3 are in series opposition, when float 10 is centered the output signal is zero. As float 10 moves in response to axial acceleration, L2 and L3 will have different amplitude outputs, and the output signal will be equal to the difference between the different amplitudes.

A rebalancing (feedback) path is provided from coils L2 and L3, and includes diodes D1–D4, capacitors C2 and C3, and resistor R3. As can readily be seen on FIG. 2, diodes D1–D4 form a full-wave rectifier bridge connected through resistor R4 across R2. Resistor R4 limits the power drawn by the feedback path. Capacitors C2 and C3, together with resistor R3, form a filter network for the output of the diode bridge. This filter network smooths the D-C output of the bridge, and applies this smoothed D-C in parallel with battery B1. The parallel D-C induces a current in L1, and increases the steady-state magnetic field therein. The increase in magnetic field induces a greater centering force in float 10, causing it to return to its quiescent position.

It should be understood that tube 11 is rotating about axis 15 whenever acceleration is being sensed, and float 10 assumes a position centered in the tube, in the well known manner.

From the above description, it can be seen that when the inventive accelerometer is accelerated along the spin axis 15 of the float 10, the float tends to move along this axis. The float movement is detected by a differential transformer L1, L2, and L3 fed by an A-C source. The A-C output of the transformer is directly related to float position. A portion of the A-C output is used to supply a rebalancing signal to the float.

The fluid 12 in which float 10 is contained is selected from these fluids having as small as possible variations in viscosity with temperature changes, since the viscosity of the fluid will directly effect the output of the accelerometer. Since no known fluid has no variation in viscosity with temperature variations, a means should be provided for compensation of the accelerometer. This can readily be done by orienting the accelerometer to read a known component of gravity. The temperature of the fluid can readily be determined by comparing the accelerometer output with the correct known value. Compensation may be made by varying the amplitude of the output of A-C source 21.

While a specific embodiment of the invention has been disclosed, other embodiments may be obvious to one skilled in the art, in light of this disclosure. For example, other types of rebalancing (feedback) circuits may be used, such as an optical link, or a servo loop.

I claim;

1. A fluid accelerometer including:
   a first hollow cylinder with a fluid therein, and rotatable about an axis;
   a second cylinder within said first cylinder, and coaxial therewith;
   rotary supporting means for said first cylinder; and
   means for detecting longitudinal displacement of said second cylinder along said axis, including a transformer having first, second, and third windings, with said first winding helically surrounding said first cylinder, and said second and third windings wound helically in opposite directions and surrounding different respective axial portions of said first cylinder.

2. The accelerometer of claim 1 wherein said second cylinder is of a magnetically permeable material.

3. The accelerometer as recited in claim 2 wherein said means for detecting includes an A-C source connected to said first winding;
   output terminals; and
   said second and third windings connected in series opposition to said output terminals.

4. The accelerometer as recited in claim 3 further including a first D-C source connected to said first winding; and a second D-C source connected to said series connected second and third windings.

5. The accelerometer as recited in claim 4 further including feedback means connected between said second and third windings and said first winding.

6. The accelerometer as recited in claim 5 wherein said feedback means includes full-wave rectifying means and smoothing filter means.

References Cited

UNITED STATES PATENTS

| | | | |
|---|---|---|---|
| 2,943,493 | 7/1960 | Bosch et al. | 73—516X |
| 2,993,382 | 7/1961 | Orrange | 73—516X |
| 3,068,704 | 12/1962 | Parker | 73—516 |
| 3,124,962 | 3/1964 | Hirtreiter | 73—516 |
| 3,175,404 | 3/1965 | Entin | 73—516 |
| 3,195,357 | 7/1965 | Bentley et al. | 73—516X |

VERLIN R. PENDEGRASS, Primary Examiner

U.S. Cl. X.R.

73—516